United States Patent Office 3,292,731
Patented Dec. 20, 1966

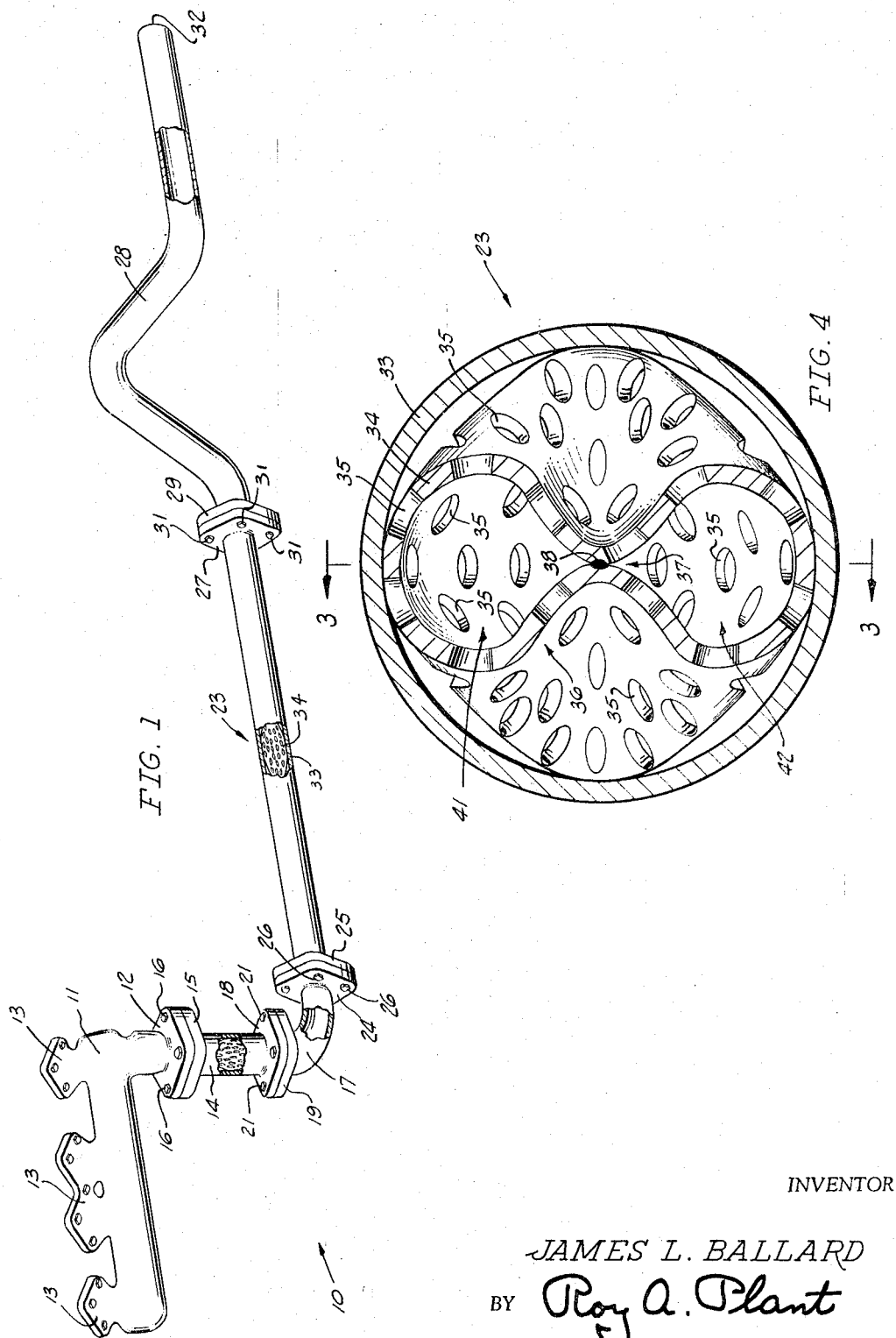

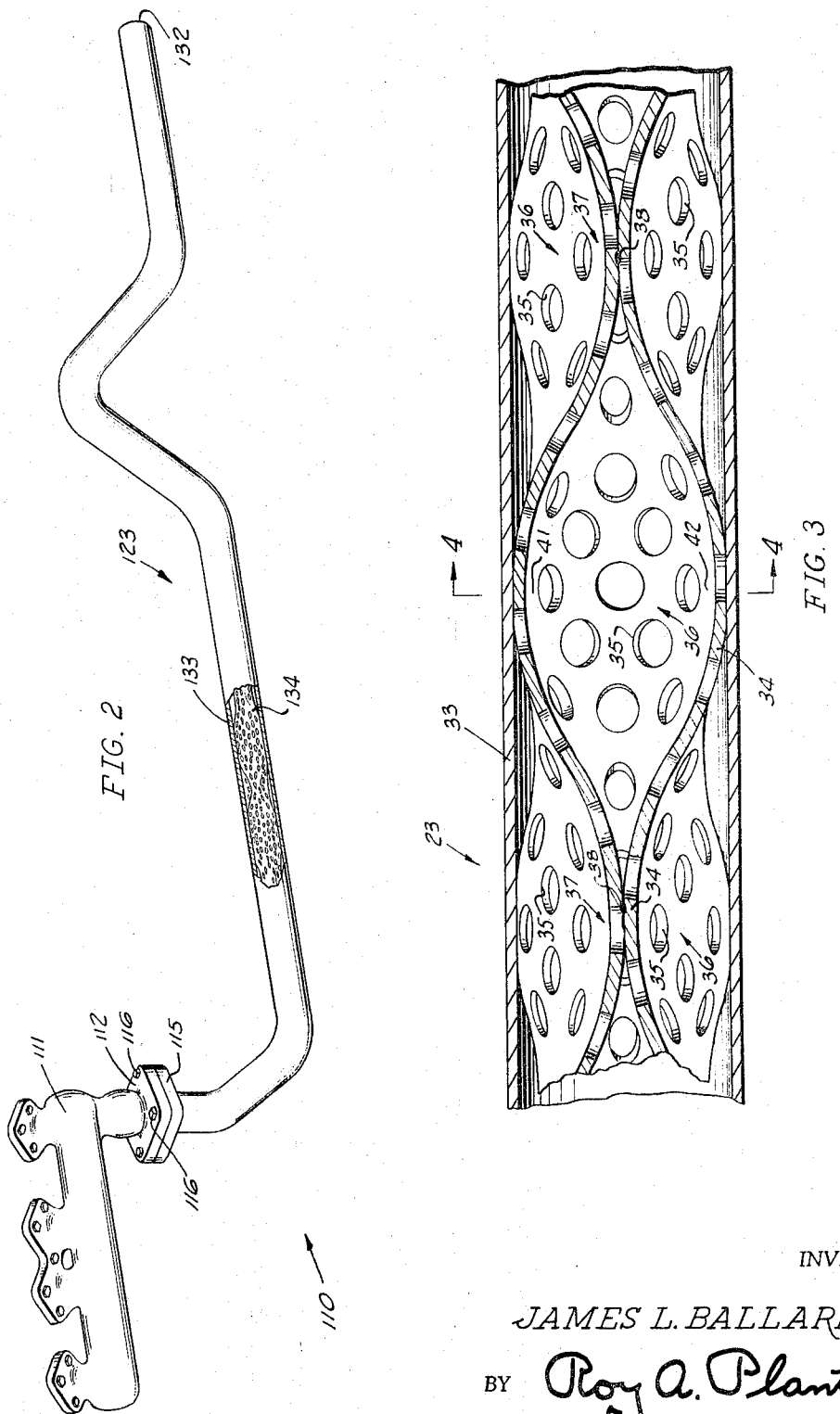

3,292,731
EXHAUST MUFFLER PIPE ASSEMBLY
James L. Ballard, 287 North Ave.,
Battle Creek, Mich. 49017
Filed Apr. 12, 1965, Ser. No. 447,451
9 Claims. (Cl. 181—36)

The present invention relates broadly to a pipe member for carrying exhaust gases away from a combustion engine, and in its specific phases to a pipe assembly to carry exhaust gases produced by an internal combustion engine, while reducing the noise level and holding the back pressure in the exhaust system to a minimum.

The automotive industry has experienced enormous growth over the years with greater expansion being expected in the future. As modern automobiles have been designed and built, many new and additional attachments and accessories have been offered and utilized by the public. The automotive industry constantly strives to produce the vehicles the consuming public demands while attempting to hold the purchase price at as low a level as possible so as to maintain the high volume of sales which has been created over the years. With all these new and additional attachments and accessories that have been provided for automobiles, there is a constant need by both the automobile manufacturers and the replacement part suppliers to furnish high quality durable and universal parts and assemblies.

The exhaust system was one of the first requirements for internal combustion engines, being a necessity for the drivers, passengers, and persons in the vicinity where the vehicles were located and used. In the more modern designs, the automobile body is much lower than in prior and original designs and ground clearance between the under parts of an automobile and the roadway is very critical and the exhaust system is one of the more vulnerable pieces of equipment exposed under the automobile.

Due to the various under car arrangements provided by the different automotive people, a large inventory is required to repair and replace defective parts of an exhaust system when just considering the most popular and largest consumed models of automobiles. Because of large weight and bulky designs, many presently available exhaust equipment requires very elaborate suspension mechanisms for hanging the exhaust system under the vehicle. It was a recognition of these problems, and the lack of a wholly satisfactory commercial solution to same in the exhaust system field which led to the conception and development of the present invention.

Accordingly, among the objects of the present invention is the provision of an exhaust system which holds the exhaust back pressure to a minimum and attenuates the noise level of the internal combustion engine explosions over a wide range of frequencies.

Another object of the present invention is to provide an exhaust system which substantially eliminates rattling due to the internal makeup of the muffler system.

Another object of the present invention is to provide an exhaust system having a minimum weight and size characteristic so as to reduce the weight which must be suspended from the under side of the automobile and also providing a maximum ground clearance for the vehicle.

Another object of the present invention is to hold to a minimum the back pressure developed in an exhaust system from exploding fuels by having a system free from back pressure caused by inertia due to gaseous reverse flow characteristics found in most of the standard muffler type exhaust systems.

Also, a further object of the present invention includes the provision of an exhaust system construction capable of accomplishing the above objectives with a minimum of material and fabricating expense, and at the same time being composed of a simple and ruggedly formed structure which is very reliable in application.

Still further objects and advantages of the present invention will appear as the description proceeds.

To the accomplishment of the foregoing and related ends, the invention, then, consists of a muffler pipe for an internal combustion engine's exhaust system as hereinafter fully described and particularly pointed out in the claims, the annexed drawings and the following description setting forth in detail certain means for carrying out the invention, such disclosed means for illustrating, however, but several of various ways in which the principle of the invention may be used.

In the annexed drawings:

FIGURE 1 is a perspective view of the manifold and exhaust system of an internal combustion engine incorporating a length of the muffler pipe assembly in accordance with the present invention.

FIGURE 2 is a perspective view of an alternate muffler pipe assembly construction having one complete length running from the manifold and terminating at the outlet end of the internal combustion engine's exhaust system and being in accordance with the present invention.

FIGURE 3 is a partial sectional view taken along line 3—3 of FIGURE 4, as seen looking in the direction of the arrows, and showing a fragmentary part of the perforated inner liner member within the outer casing member of the muffler pipe assembly.

FIGURE 4 is a partial sectional view taken along line 4—4 of FIGURE 3, as seen looking in the direction of the arrows, and showing a typical end view of the perforated inner liner member positioned within the outer casing member of the muffler pipe assembly and compressed into a figure eight shape in accordance with the present invention.

Referring generally to FIGURE 1, there is shown an internal combustion engine exhaust system 10 having an engine's manifold 11 with a mounting flange 12. Exhaust manifold 11 has intake ports 13 which are mounted appropriately to an internal combustion engine to receive its exhaust gases in a manner which is well known in the art. The mounting flange 12 connects an exhaust pipe 14 to the manifold 11 and is secured to a mounting flange 15 of exhaust pipe 14 by mounting bolts 16. The exhaust pipe 14 is connected to a curved connecting pipe 17 by having a mounting flange 18 of exhaust pipe 14 connected to a mounting flange 19 of the connecting pipe 17 by mounting bolts 21. The connecting pipe 17 connects exhaust pipe 14 to a muffler pipe assembly 23 by a mounting flange 24 of connecting pipe 17 being secured to a mounting flange 25 of the muffler pipe assembly 23 by mounting bolts 26. The muffler pipe assembly 23 has another mounting flange 27 near its outlet end connecting it to tailpipe 28. Tailpipe 28 has a mounting flange 29 connected to the mounting flange 27 of muffler pipe assembly by mounting bolts 31.

The exhaust gases received by the manifold intake ports 13 pass through the manifold 11, on through exhaust pipe 14 and connecting pipe 17, through the muffler pipe assembly 23, on through tailpipe 28 and then escape to the atmosphere out end area 32 of the tailpipe 28. Gasket members can be used between the various mounting flanges to prevent the escape of the exhaust gases from the exhaust system before they reach the end area 32. These gasket members are made of various forms and materials which are well known in the art.

The exhaust system 10 will be suspended from the bottom of the automobile by hanger members, not shown in the drawings, which are well known in the art, an example of which would be vulcanized shear type rubber cushion mounting fixtures. These are used to prevent any of the rattling or exhaust noises from being transferred through the body structure of the vehicle to the passenger compartment. The hanger member system also permits proper expansion and retraction of the exhaust system due to the wide temperature range which acts on it, affecting its length and position under the vehicle.

The muffler pipe assembly 23 replaces a standard type muffler. Its construction allows it to break up the acoustical noises transmitted from the engine through the exhaust gases while holding the exhaust gases' back pressure to a minimum and does not cause a reverse flow of the exhaust gases while they are passing to the atmosphere, as will be explained in more detail below.

The muffler pipe assembly 23 has a tubular outer casing member 33 and a tubular inner casing or liner member 34. The inner casing member 34 has perforations 35 through its walls in either a uniform, quasi uniform, or random pattern. The inner liner member 34 is pinched or pressed together along its axial length in radical compressions 90° from each other, as viewed in FIGURES 3 and 4. The compressed areas could be in various forms such as straight in line, less or more than 90° in a random or uniform rolling pattern. Each compression, in the present illustration, will form a figure eight indicated generally as 36, as shown for example in FIGURE 4. The inner surfaces of liner member 34 will meet at compressed areas indicated generally as 37, having a weld 38 in a preferred embodiment.

The figure eight 36 as illustrated in FIGURE 4 forms channels 41 and 42 through which the exhaust gases can easily flow. The next compressed area 37, in the illustration in FIGURES 3 and 4, will have its two channels 41 and 42 radially spaced 90° from the corresponding channels 41 and 42 of the prior figure eight 36. This will cause some of the exhaust gases to rotate this 90° and other of the exhaust gases to escape through the perforations 35 from the inner liner member 34 to the pocket or spaces between the inner liner member 34 and outer casing member 33 through the perforations 35. As the exhaust gases continue along the muffler pipe assembly 23 toward the tailpipe 28, they will be continually moved into and out of the inner liner member 34 through perforations 35 and traveling through the channels 41 and 42 as dictated by the compressed areas. This construction provides a means to attenuate the noise level of the exhaust gases without creating a restrictive back pressure which reduces the performance of the engine.

As shown in FIGURE 1, the exhaust pipe 14 has a section of inner liner member 34 to initiate the muffling and attenuating of the noise level of the explosions of the internal combustion engine as soon as the exhaust gases pass from the exhaust manifold 11. FIGURE 1 also discloses a system which can be adapted to the presently used and designed standard muffler systems on the market, giving the benefit of the present invention to owners of vehicles presently being made and in use. Universal adapting means would be provided to fit the muffler pipe assembly 23 into the various standard exhaust systems.

FIGURE 2 discloses a muffler pipe assembly 123 connected to an exhaust manifold 111 by having a mounting flange 112 of the manifold 111 connected to a mounting flange 115 of the muffler pipe assembly 123 by mounting bolts 116. In this application the muffler pipe assembly 123 would have an outer casing member 133 and an inner casing or liner member 134. The inner casing member 134 would have available to it the various configurations, styles and forms as described above for tubular inner casing member 34, but would run substantially the complete length of an internal combustion engine's exhaust system 110 from the exhaust manifold 111 to the end area 132. This would have special application where a greater attenuating effect was desired.

If it was felt necessary or desirable by the user, seller, or manufacturer, any exhaust system utilizing the present invention could have spot welds placed on the outer extremes of the inner liner member 34 or 134 where it contacts outer casing member 33 or 133, respectively, thus giving an additional preventive measure against internal rattling or vibrating. This would not usually be of too much necessity because the normal application would be to spot weld the outer extremes of the inner liner member 34 or 134 to the outside casing member 33 or 133 near the ends of the muffler pipe assembly 23 or 123, respectively. Another application could be to have the inner casing or liner member 34 or 134 press fitted into the outer casing member 33 or 133, respectively, eliminating the possibility of internal rattling or vibrating and the need for any spot welding.

The inner liner member 34 or 134 permits tuning of the system to maintain a low pressure throughout the exhaust system, and particularly at the intake ports 13, thus assisting in scavenging and charging the internal combustion engine cylinders. The present invention would permit extreme reforming and reshaping of the muffler pipe assembly of the exhaust system during installation and still retaining the muffler and attenuating effects. The outer casing member 33 or 133 could be made from flexible tubing so that an exhaust replacement shop would merely stock rolls of tubing and easily form and reshape the muffler pipe assembly to fit the vehicle as required by its design characteristics. This would greatly reduce and eliminate many inventory problems presently encountered by the automobile service shops.

From the foregoing, it will be seen that novel and advantageous provisions have been made for obtaining the desired ends; however, attention is invited to the possibility of making minor variations within the spirit and scope of the invention as shown and described. Therefore, the embodiments described in the specification and shown in the drawings are to be considered as merely being set forth for illustrative purposes, and are not intended to limit the scope of the invention herein described and shown.

Other modes of applying the principles of my invention may be employed instead of those explained, change being made as regards the details herein disclosed, provided the features stated by any of the following claims or the equivalents of such stated features be employed.

I therefore particularly point out and distinctly claim as my invention:

1. An exhaust system for an internal combustion engine, with said exhaust system connected to said engine's exhaust manifold having,
    (a) a muffler pipe assembly,
    (b) a connecting means joining said exhaust manifold with said muffler pipe assembly,
    (c) an end area connected with said muffler pipe assembly to discharge the exhaust gases formed by said engine from the exhaust system,
    (d) an outer casing member as the outside unit of said muffler pipe assembly,
    (e) a tubular perforated inner liner member secured within said outer casing member,
    (f) said inner liner member having at least one compressed area section along its axial length forming at least two separate and independent channel passages within the inner liner member, and
    (g) a second compressed area section along the axial length of said tubular inner liner forming at least two separate and independent channel passages and radially positioned from the first compressed area section.

2. An exhaust system as specified in claim 1, having,
    (a) said compressed area sections being welded together substantially at the center area of said inner liner.

3. An exhaust system for an internal combustion engine, with said exhaust system connected to said engine's exhaust manifold having,
(a) a muffler pipe assembly,
(b) a connecting means joining said exhaust manifold with said muffler pipe assembly,
(c) an end area connected with said muffler pipe assembly to discharge the exhaust gases formed by said engine from the exhaust system,
(d) an outer casing member as the outside unit of said muffler pipe assembly,
(e) a tubular perforated inner liner member secured within said outer casing member,
(f) said inner liner member having at least one compressed area section along its axial length forming at least two separate and independent channel passages within the inner liner member, and
(g) a series of compressed area sections along the axial length of said tubular inner liner forming two channel passages, and
(h) each compressed area section channel passages being radially positioned 90° from the prior one.

4. An exhaust system as specified in claim 3, having,
(a) said compressed area sections being welded together substantially at the center area of said inner liner.

5. An exhaust system for an internal combustion engine, with said exhaust system connected to said engine's exhaust manifold having,
(a) a muffler pipe assembly,
(b) a connecting means joining said exhaust manifold with said muffler pipe assembly,
(c) an end area connected with said muffler pipe assembly to discharge the exhaust gases formed by said engine from the exhaust system,
(d) an outer casing member as the outside unit of said muffler pipe assembly,
(e) a tubular perforated inner liner member secured within said outer casing member,
(f) said inner liner member having at least one compressed area section along its axial length forming at least two separate and independent channel passages within the inner liner member, and
(g) said compressed area section substantially in the form of a figure eight forming two separate and independent channel passages.

6. An exhaust system as specified in claim 5, having,
(a) said compressed area sections being welded together substantially at the center area of said inner liner.

7. A combined muffler and tailpipe exhaust system for internal combustion engines, with said exhaust system connected to said engine's exhaust manifold, having,
(a) a muffler pipe assembly connected to said exhaust manifold to receive the exhaust gases produced by said engine,
(b) an end area as part of said muffler pipe assembly for discharging the exhaust gases reecived by said exhaust system,
(c) an outer casing member as the outside unit of said muffler pipe assembly,
(d) a perforated inner liner member secured within said outer casing member, and
(e) a first compressed area section along the axial length of said inner liner member forming at least two separate and independent channel passages therein, and
(f) a second compressed area section along the axial length of said inner liner member forming at least two separate and independent channel passages and radially positioned from the first compressed area section.

8. An exhaust system for an internal combustion engine having a series of sections and connected to said engine's exhaust manifold having,
(a) a muffler pipe assembly as one section,
(b) an exhaust pipe as one section and connected to said manifold,
(c) means joining said exhaust pipe and said muffler pipe assembly,
(d) a tailpipe having one end connected to said muffler pipe assembly and another end as an outlet means,
(e) an outer casing member as the outside unit of said muffler pipe assembly,
(f) a perforated inner liner member in secured contact with the inner surface of said outer casing member,
(g) a series of compressed area sections along the axial length of said inner liner member forming two separate and independent channel passages, and
(h) each compressed area section being radially positioned from the adjacent sections.

9. An exhaust muffler for an internal combustion engine, having
(a) an outer casing,
(b) a perforated inner casing positioned within said outer casing,
(c) a first compressed area section along the axial length of said inner casing forming two separate and independent channel passages,
(d) said two channel passages of said first compressed area extending into a single passage chamber,
(e) a second compressed area section along the axial length of said inner casing forming two separate and independent channel passages radially positioned substantially 90° degrees from said first compressed area section's channel passages, and
(f) said single passage chamber extending into said two channel passages of said second compressed area section.

References Cited by the Examiner

UNITED STATES PATENTS 1,934,462 11/1933 Hartsock _____ 181—42
3,209,859 10/1965 Lentz et al. _____ 181—56

FOREIGN PATENTS 534,933 10/1955 Italy.

RICHARD B. WILKINSON, *Primary Examiner.*

LOUIS J. CAPOZI, *Examiner.*

ROBERT S. WARD, *Assistant Examiner.*